Patented Aug. 19, 1947

2,426,125

UNITED STATES PATENT OFFICE 2,426,125

MANUFACTURE OF GLYCOL ALGINATES

Arnold B. Steiner, La Jolla, Calif., assignor to Kelco Company, San Diego, Calif., a corporation of Delaware No Drawing. Application April 3, 1944, Serial No. 529,423

6 Claims. (Cl. 260—209.6)

The invention relates to reactions between alginic acid and certain of the lower epoxy-paraffins or alkylene oxides (e. g., ethylene oxide) by which the properties of this acid are materially changed.

The invention relates also to the products of the above named reactions, these products having some of the desirable properties of the water-soluble salts of alginic acid, together with certain other desirable characteristics which these salts do not possess.

Alginic acid is the colloidal polyuronic acid obtained from certain marine algae of the class Phaeophyceae, commonly known as the brown algae. The species of primary commercial interest are the giant brown kelps, Macrocystis, Laminaria, Nereocystis and Fucus.

Alginic acid appears to consist entirely of d-mannuronic anhydride residue linked glucosidically in accordance with the following formula:

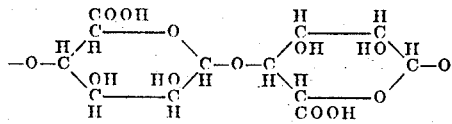

Thus, the mannuronic acid units are linked in such manner that the carboxyl groups are free to react while the aldehyde groups are shielded by linkages.

Alginic acid is substantially insoluble in water. The pH of the free acid in 1% aqueous dispersion is 2.0 to 2.5, which may in part be due to retention of traces of the mineral acid used in its preparation. It forms freely water-soluble salts with the alkali metals, magnesium, ammonium, the lower amines and some other organic bases. These salts form viscous, colloidal, aqueous solutions, the viscosity (for any given concentration) increasing with the number of mannuronic acid units linked in the molecule. All of these salts possess marked hydrophilic colloidal properties, only a minute proportion of the salt being required to produce a viscous solution having strong water-retaining characteristics. These salts are stable in an alkaline medium but are readily decomposed by most of the mineral and many of the organic acids.

Alginic acid forms substantially or completely water-insoluble salts with all of the alkaline-earth metals except magnesium, and with all of the heavy metals. For some purposes this property is highly useful, as it permits the formation of gels of various types by chemical reaction. For other purposes this property is disadvantageous and sharply limits the commercial utility of these salts. Thus, the soluble alginates are not stable in acid media below about pH4 and cannot be dissolved in aqueous liquids containing even minute proportions of calcium. Thus, to render them compatible with liquids such as milk requires an elaborate formulation with buffers or precipitants for calcium.

I have discovered that it is possible to add a molecule of one of the lower epoxy-paraffins to the mannuronic acid unit and thus to obtain a product which is freely water-soluble, which retains all of the viscosity, colloidality and hydrophilic property of the soluble alginates, and which is compatible with even strong acid solutions and with the salts of the alkaline-earth and the heavy metals. These compatibilities deprive the new product of utility for purposes requiring chemical gelatinization but widely extends its usefulness in other directions.

The raw materials for this process are: Free alginic acid, in a suitable state of hydration, and an alkylene oxide, to-wit, ethylene oxide or one of its reactive homologues. So far as I am at present aware, the alkylene oxide should have its oxygen coupled to adjacent carbon atoms, or to carbon atoms separated by only one position, as for example: epoxyethane; 1,2 or 1,3 epoxypropane; 1,2, 1,3 or 2,3 epoxybutane, 1,2 epoxy 2, methyl propane, etc.

In the absence of experimental quantities of the alkylene oxides containing five or more carbon atoms it has been impossible to fix the limit of chain length in which the oxide will be reactive. General considerations, and observation of the behaviors of the oxides containing two, three and four carbon atoms leads to the belief that, while oxides containing more than five chain-linked carbon atoms may be reactive under some conditions, those conditions will not favor the production of a satisfactory product.

The product is obtained by direct combination, in an acid environment and under suitable conditions of temperature and pressure, all of which will be described in detail hereinbelow.

The alginic acid used as raw material may be produced by any of the methods known in the prior art. For example, it may be obtained by digesting the kelp with sodium carbonate, diluting the resultant paste and filtering to remove cellulose, precipitating the algin as calcium alginate, and decomposing the calcium salt with hydrochloric acid (U. S. Patents 1,814,981, 2,036,922, 2,036,934). If preferred, the filtrate may be precipitated by the use of a strong acid and the alginic precipitate washed with ethyl alcohol to remove moisture and impurities (U. S. Patent 2,128,551). The free acid from the above or other modifications of the general method may be used for my purpose, provided only that the acid be in a state of commercial purity.

Whatever the source, the acid should be in the form of threads, fibres or other state of subdivision affording a relatively large surface for contact between the solid acid and the liquid or gaseous organic oxide. Such comminution accelerates the reaction and tends to reduce the proportion of epoxy-paraffin required to complete it within a practicable time, as well as reducing the tendency toward undesired changes in the constitution of the acid during the reaction period.

Up to this time it has been found impossible to produce the desired reaction with the use of a completely dehydrated acid. While it is difficult to see how water enters into the reaction, the presence of a small quantity appears either to exercise a catalytic function or to so control the physical state of the acid as to permit the reaction to proceed. Preferably the acid is dried down to from 20% to 30% water content, though with care it is possible to go to 10% moisture or even lower. At the other end of the scale it is possible to work with acid as precipitated, containing usually about 80% water. As increasing quantities of water in the reaction zone tend to increased loss of alkylene oxide by formation of glycol, it is desirable to reduce the water content of the acid as low as is consistent with rapid and complete reaction.

In drying a wet acid, care must be taken to avoid depreciation of its quality. As is well known, alginic acid may be "depolymerized" (the length of the mannuronic chain reduced) by undue or prolonged heating, with an attendant reduction in the specific viscosity of the soluble alginates produced from it. This viscosity reduction has been found to carry into the product made by the instant method from such depreciated algins. Further, excessive temperature or long extended heating may lead to the formation of nonreactive lactone rings. This lactone formation is favored by the location of the hydroxyl groups in the gamma and delta positions in the alginic acid molecule, and is caused by the loss of water between the hydroxyl and carboxyl groups to form an inner ester. As the reaction desired is that taking place between the alkylene oxide and the carboxyl group, the lactones formed in this manner are nonreactive and the final product will be incompletely soluble.

It is therefore necessary to dry the wet acid carefully and at as low a temperature as possible. Various known methods are available, such for example as (1) passing air of controlled humidity, at atmospheric temperature, through a pervious mass of the acid; (2) soaking the acid in an alcohol, pressing out the excess alcohol and recovering the remainder in a reduced pressure system; (3) drying at low temperature under sharply reduced pressure; (4) soaking the acid in alcohol until a desired proportion of the water has been transferred to the liquid, pressing out the excess alcohol and passing the acid to the reaction step without further drying. These are suggestions only and other drying methods may be used. If the acid is not already sufficiently comminuted, prior to drying, it should be comminuted following this step, as for example by passing through a hammer mill.

The combination between alginic acid and alkylene oxide begins on contact of the components and, as the reaction is exothermic, the temperature tends to rise during the earlier and more energetic stages. As the two epoxy-paraffins commercially available at the present time boil at low temperatures (10.7° for ethylene oxide and 35° C. for 1,2 propylene oxide) the oxide may be in either the liquid or the vapor phase, or both, in the contacting vessel, depending on the temperature and pressure obtaining. The vessel should be of the general nature of an autoclave, closed to prevent loss of vapor, and should be provided with efficient stirring apparatus to ensure complete contact and combination. Means to control the temperature, such as a jacket arranged for both heating and cooling, should be provided. The examples below illustrate practical ways of effecting the combination.

*Example 1*

Alginic acid having a moisture content of about 80% was dried by passing through it air at room temperature until the water content was reduced to 27%. The dried product was shredded by passing it through a hammer mill.

137 weight parts of the dried acid (equal to 100 parts anhydrous acid and 37 parts water) were placed in a pressure reaction vessel, together with 126 parts of 1,2 propylene oxide, this being about four times the stoichiometric equivalent. The vessel was immediately sealed and the contents agitated during the period of the test.

For the first half hour, during which no external heat was applied, the pressure rose gradually to about ten pounds per square inch, after which it began to decrease. The temperature also rose but owing to atmospheric cooling of the small reaction vessel this rise was insufficient to maintain the pressure. A gentle heat was applied as soon as the pressure decrease was observed, and the ten pound pressure was maintained during the second half hour.

At the end of the hour the vessel was cooled and opened. The product, believed to be correctly described as propylene glycol alginate, was an apparently dry, fibrous material which readily dissolved in water to give a clear, colorless, very viscous solution.

The yield from this operation figured on the dry alginic acid used, was 150% as compared with a theoretical yield of 132%. The excess is believed to be due to the formation of glycol or ethers, or both. The MacMichael viscosity of a 2% aqueous solution of the product was 1800 centipoises and its pH value 4.3.

*Example 2*

Alginic acid having a moisture content of about 80% was shredded and immersed in an equal weight of anhydrous isopropyl alcohol and allowed to soak for two hours. The excess alcohol was then drained and pressed out, yielding a mass containing about 50% solids, the balance being alcohol and water.

200 weight parts of this material (100 parts of anhydrous acid) were placed in the reaction vessel with 126 parts (four times the stoichiometric quantity) of 1,2 propylene oxide. On sealing the vessel and agitating the contents the pressure rose to twelve pounds during the first hour and decreased to eight pounds during the second hour, after which the vessel was heated to maintain a pressure of ten pounds during a third hour.

The product, propylene glycol alginate, was found to be in a fluffy, fibrous state. It dissolved readily in water to form a clear, semigelatinous solution.

The yield from this operation was 160% of the dry weight of alginic acid taken; the viscosity in 2% aqueous solution was 4500 centipoises, and the pH value 3.1.

*Example 3*

Alginic acid of about 80% water content was treated with four times its weight of anhydrous isopropyl alcohol, drained and air dried at room temperature to a moisture content of 8%. The acid was then ground to a fine, fibrous mass after which 500 parts (containing 460 parts of anhydrous acid) were wet with 100 parts of water containing a small amount of an organic wetting agent. The material was then reacted with 342 parts of propylene oxide (2.4 times the stoichiometric quantity) with agitation in a pressure vessel.

The pressure in the vessel rose to six pounds in about one hour and was maintained at that level for another hour by the application of heat. The resultant propylene glycol alginate was a fluffy, fibrous product, readily soluble in water to give a clear, viscous solution.

The yield from this operation was 140% of the weight of alginic acid; the viscosity of a 2% aqueous solution was 5000 centipoises, and the pH value of the 2% solution was 2.8.

*Example 4*

3505 weight parts of alginic acid with a moisture content of about 86% were treated in a pressure vessel with 2500 parts propylene oxide (sixteen times the stoichiometric quantity). The reaction mixture was stirred for about two hours, after which it was removed and the excess oxide driven off. The product was in the form of a thick paste, containing a considerable proportion of propylene glycol. It dissolved readily in water to give a viscous solution.

The yield from this operation was 170% of the weight of alginic acid; the viscosity of a 3% aqueous solution was 200 centipoises, and the pH value of the 3% solution was 2.9.

*Example 5*

Alginic acid of about 80% moisture was shredded and immersed in an equal weight of anhydrous isopropyl alcohol, in which it was allowed to soak for one hour. The excess of alcohol was then drained and pressed out, yielding a mass containing 55% solids, the balance being alcohol and water.

364 weight parts of this material (equal to 200 parts anhydrous acid) were placed in the reaction vessel with 190 parts (3.8 equivalents) of ethylene oxide. On stirring for one hour the pressure rose to a maximum of 18 pounds gauge. The pressure was then raised to 30 pounds by the application of heat, and maintained at that level for one-half hour. The resultant product, believed to be ethylene glycol alginate, was a fibrous, fluffy material, readily soluble in water to give an exceedingly viscous solution.

The yield from this operation was 135% of the weight of alginic acid; the viscosity of a 2% aqueous solution was 30,000 centipoises, and the pH value of the 2% solution was 3.2.

The quantitative relation between alginic acid and alkylene oxide, in the reaction vessel, is not critical. Up to this time, however, it has not been found possible to obtain complete reaction and a fully water-soluble product without the use of a considerable excess of the organic oxide over the calculated quantity. The smallest quantity which has yet produced a fully soluble product in a reasonable time of reaction is of the order of two equivalents, or an acid:oxide weight relation of 2.0:1.0 for ethylene oxide or 2.0:1.32 for propylene oxide.

The temperatures obtaining in these experiments were of the order of 140° to 170° Fahr. and, with slight exceptions, were such as were produced spontaneously during the earlier and more energetic stages of the operation. During the later stages it was necessary to maintain the temperature by applying small amounts of wet steam to the exterior of the vessel. Any temperature about the boiling point of water should be avoided as tending to charring of the reacting mass and to the degradation of the unreacted portions of the alginic acid.

At the end of the reaction there is usually some excess of the oxide remaining, which may be distilled off and recovered. Some of the oxide appears to combine with water to form the corresponding glycol. If for any reason the presence of glycol in the product is objectionable it may be distilled off or removed by washing with a selective solvent such as alcohol or acetone.

The method of contacting suggested by the above examples is illustrative only. As the sole requirements are: subdivision of the solid acid, contact of the acid with the oxide in either liquid or vapor phase, and control of the temperature within reasonable limits, the apparatus and the manipulation are subject to considerable variation. As alternatives, it is permissible to reflux the organic oxide through a reaction chamber loosely packed with the moist alginic acid; or to disperse the acid in a relatively inert organic liquid such as acetone and add the epoxy-paraffin to this dispersion, refluxing any vapor which may be evolved.

While the invention is not limited to any theory as to the course of the reaction, the most probable explanation is that the alkylene oxide, having an oxygen atom linked to two carbon atoms, displaces hydrogen from the carboxyl group to which the acidity of the alginic body is due, utilizing the displaced hydrogen to satisfy the freed oxygen bond. Thus, for ethylene oxide the empirical reaction would be

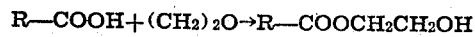

$$R—COOH + (CH_2)_2O \rightarrow R—COOCH_2CH_2OH$$

and the structure of the product would be represented as

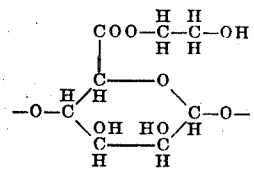

This theory is supported by the known monovalence of alginic acid and the certainty that in its alkali metal salts the metal has displaced hydrogen from the carboxyl group.

It is recognized that other possibilities exist. Thus, the alkylene oxide may react with one or more of the hydroxyl groups of the mannuronic ring in addition to the carboxyl group. In this view the reaction for ethylene oxide would be represented empirically as

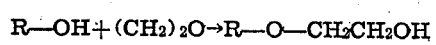

$$R—OH + (CH_2)_2O \rightarrow R—O—CH_2CH_2OH$$

and the structure of the product as

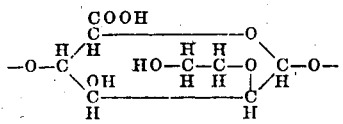

There is the further possibility that the glycol group in the primarily formed glycol alginate may again add a molecule of the oxide to form a second (or even additional) glycol groups in chain. This possibility would be represented by the empirical formula

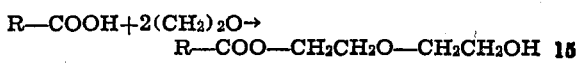

and the structure of the product as

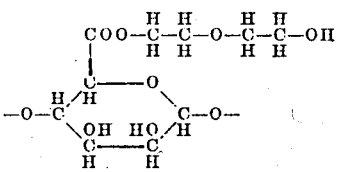

Theorizing aside, the above described direct combination of alginic acid with one of the lower epoxy-paraffins yields a heretofore unknown product, in some respects resembling the alkali metal or ammonium alginates, in others sharply distinguished from these salts.

The similarities are in complete and ready solubility in pure water, in extreme colloidality and in the high viscosity of dilute aqueous solutions. The distinctions are in the compatibilities, the soluble alginate salts being precipitated or gelatinized by acids, by soluble salts of all the alkaline-earth metals except magnesium, and by soluble salts of the heavy metals, while the new products are neither gelatinized nor precipitated by any of these agents. In consequence, the new products are adapted to function in acid media, in calcareous waters and in organic substances containing lime, while the soluble alginates require a substantially neutral or alkaline medium and are capable of gelatinization through suitable chemical reactions. It will be evident that the old and the new products have widely divergent fields of utility and that they are competitive in only the situations in which the aqueous liquid is substantially neutral and substantially free from salts other than those of the alkali metals or magnesium.

In the claims, the term "alkylene glycol alginate" will be understood to refer to the reaction product of an alkylene oxide with alginic acid, the oxide being believed to react mainly with the carboxyl groups of the acid but not excluding the possibility of some reaction with the hydroxyl groups thereof.

I claim as my invention:

1. The method of modifying alginic acid to render it water-soluble which consists in treating the free acid, in the presence of water, with an alkylene oxide containing not more than five carbon atoms.

2. The method of producing glycol alginates which consists in contacting free alginic acid, in the presence of water, with an alkylene oxide containing not more than five carbon atoms, at a temperature not exceeding 212° Fahr. and at a pressure corresponding to the vapor pressure of the reacting mass at the temperature employed.

3. A solid alkylene glycol alginate containing not to exceed five carbon atoms in the alkyl radical, forming substantially clear, viscous, colloidal solutions in water, characterized by compatibility with acids and with calcium salts.

4. A solid product consisting substantially of alginic acid having at least one of its replaceable hydrogen atoms substituted by a hydroxyl-substituted alkyl radical containing not more than five carbon atoms, said solid forming substantially clear, viscous, colloidal solutions in water, characterized by compatibility with acids and calcium salts.

5. The solid addition product of alginic acid and an alkylene oxide containing not more than five carbon atoms, characterized by forming substantially clear, viscous, colloidal, aqueous solutions in the presence of acids.

6. A solid alkylene glycol alginate containing not to exceed five carbon atoms in the alkyl radical, characterized by forming substantially clear, viscous, colloidal, aqueous solutions in the presence of acids.

ARNOLD B. STEINER.

REFERENCES CITED

The following references are of record in the file of this patent:

UNITED STATES PATENTS

| Number | Name | Date |
|---|---|---|
| 2,158,486 | Preble | May 16, 1939 |
| 2,158,487 | Preble | May 16, 1939 |
| 2,202,169 | Schlack | May 28, 1940 |
| 2,337,562 | Lund | Dec. 28, 1943 |

FOREIGN PATENTS

| Number | Country | Date |
|---|---|---|
| 417,556 | Great Britain | Oct. 8, 1934 |